US012695861B2

(12) United States Patent (10) Patent No.: US 12,695,861 B2
Thomas (45) Date of Patent: Jul. 28, 2026

(54) INTRINSIC PARAMETER TESTING

(71) Applicant: ASMPT AEi, Inc., Billerica, MA (US)

(72) Inventor: John Thomas, Arlington, MA (US)

(73) Assignee: ASMPT AEi, Inc., MA (US)

( * ) Notice: Subject to any disclaimer, the term of this patent is extended or adjusted under 35 U.S.C. 154(b) by 272 days.

(21) Appl. No.: 18/137,661

(22) Filed: Apr. 21, 2023

(65) Prior Publication Data

US 2024/0357073 A1 Oct. 24, 2024

(51) Int. Cl.
 *H04N 17/00* (2006.01)
 *G02B 27/30* (2006.01)
 *G03B 17/12* (2021.01)
 *G06T 7/80* (2017.01)
 *H04N 23/56* (2023.01)
(52) U.S. Cl.
 CPC .......... *H04N 17/002* (2013.01); *G02B 27/30* (2013.01); *G03B 17/12* (2013.01); *G06T 7/80* (2017.01); *H04N 23/56* (2023.01)
(58) Field of Classification Search
 CPC ............ G02B 27/30; G03B 17/12; G06T 7/80
 See application file for complete search history.

(56) References Cited

U.S. PATENT DOCUMENTS

| 2014/0036096 | A1* | 2/2014 | Sterngren | ............ | H04N 17/002 |
| | | | | | 348/188 |
| 2015/0138372 | A1 | 5/2015 | Apel et al. | | |
| 2022/0137425 | A1* | 5/2022 | Konrad | ................. | G02B 27/36 |
| 2022/0414930 | A1 | 12/2022 | Muhassin et al. | | |

FOREIGN PATENT DOCUMENTS

| EP | | 3076148 | A1 * | 10/2016 | ........ | G01M 11/0264 |
| WO | WO 2021/150689 | A1 | | 7/2021 | | |

* cited by examiner

*Primary Examiner* — Thanh Luu
(74) *Attorney, Agent, or Firm* — OSTROLENK FABER LLP

(57) ABSTRACT

Intrinsic parameter testing apparatus and methodology, which may variously shorten process time by using a plurality of collimators capable of azimuthal rotation, and address chromatic aberration by providing independently actuable illumination means associated with the or each collimator, for selectively supplying light of various wavelength ranges.

20 Claims, 4 Drawing Sheets

INTRINSIC PARAMETER TESTING

This invention relates to intrinsic parameter testing tools and methods for intrinsic parameters of a camera under test.

BACKGROUND AND PRIOR ART

The present invention relates to the measurement or determination of intrinsic parameters of a camera (i.e. parameters associated with the camera itself, as opposed to 'extrinsic parameters', which relate for example to the attitude or position of the camera), and also the independent validation of previously-determined intrinsic parameters. Throughout this document, the term "intrinsic parameter testing" will be used both to refer to the measurement or determination of the intrinsic parameters, and also to validation of previously-determined intrinsic parameters. Such intrinsic parameter measurement can, for example, be used to assess whether a camera under test meets a required quality threshold, and may also be used for subsequent calibration or correction of the camera.

In conventional intrinsic parameter testing systems, at least one optical target having optically identifiable features is used, with the testing process requiring precise knowledge of the location of the features with respect to the camera being measured.

A conventional process involves placing two targets with known angular separation relative to the camera whose intrinsic parameters are being tested, and this process is schematically shown in FIG. 1. For example, where testing involves validation of previously-measured intrinsic parameters, one image from a camera 1 under test validates one small section of the total field of view of the camera 1 by comparing the actual distance between two targets 2, 3 compared to the calculated value using the intrinsic parameters of the camera 1. The angular separation $\emptyset$ between the targets 2, 3 in this traditional method is determined measuring the distance to each target 2, 3 from the camera 1, and the distance between the targets 2, 3 is measured using a laser. To check across the whole camera field of view, the camera 1 is rotated, which could be up and down, left and right or around its lens pupil, so that the targets 2, 3 appear in different regions of the image. The set of images obtained can be used to check the accuracy of the intrinsic parameters of the camera 1 across its whole field of view. There are various problems associated with such processes however. For example, such a testing process typically requires a set-up with targets 2, 3 that are about 10 m apart, with each target 2, 3 being about 15 m to 20 m from the camera 1 under test. The resultant large footprint makes it impractical to design a testing machine, and so the process is instead typically done in some sort of open floor. The large footprint is itself an impediment to automating the testing process and can also lead to issues with lighting and image quality that can impact the test. Testing of a single camera 1 can take up to an hour and changeover between cameras can be difficult due to the rotational mechanism required.

An alternative apparatus, which addresses some of these problems, i.e. an intrinsic parameter testing tool, is schematically shown in FIG. 2. Here, the camera 1 under test is supported on an azimuthal rotary table 4 so that it is positioned beneath an infinity-focused collimator 5, which is mounted to an elevation rotary support 6, which enables the collimator 5 to be moved +/−100 degrees across the field of view of the camera 1, about a rotary axis substantially orthogonal to the optical axis 7 of the camera 1, which extends outwardly in a predetermined direction, here vertically upwards. This rotation is effected by an elevation rotary actuator 8. The azimuthal rotary table 4 can be rotated about an azimuthal rotary axis substantially parallel to and coincident with the optical axis 7, by azimuthal rotary actuator 9, to change the position of the elevation scans. By using an infinity-focused collimator 5 on a rotary table 4, angular separation between targets can be accurately controlled just by rotating the collimator 5, using the elevation rotary actuator 8, between images obtained from the camera 1 under test. The infinity-focused collimator 5 comprises a backlit reticle with a focusing lens to project that reticle as if it were infinitely far away. This removes all impact from linear translations on an image. The angular separation, equivalent to the angular separation $\emptyset$, shown in FIG. 1, is created through the rotation of the collimator 5 using the elevation rotary actuator 8. Two image captures are required to create one image pair. An example of a scan of image target locations is shown in FIG. 3, where several image pairs are created. Effecting azimuthal rotation between images, by actuating the azimuthal rotary actuator 9, allows for scans to be performed across more regions of interest of the camera image. An example of such a scan is shown in FIG. 4.

This provides a method to test the intrinsic parameters for a particular camera 1 in a much smaller footprint than using physical targets, and makes full automation of the process practical.

An alternative apparatus which attempts to address such problems is known from WO-2021/150689-A1. In that apparatus, a plurality of collimators are provided which project a plurality of markers onto a target surface. A camera under test captures a plurality of images of the target surface, with the camera being rotated between each image capture.

With all of these systems, lighting can be very hard to control. Often the process is performed in any available open space, that could for example be used for a variety of purposes using fluorescent lighting or other ambient light. This can impact the quality of the images of the targets 2, 3. The camera lenses can also exhibit chromatic aberration, so the results of the test can be impacted by the color of the ambient light. Specifically, the lateral color from the chromatic aberration causes the light to focus onto slightly different points on the camera sensor depending on the color. This will impact the accuracy of any distortion calculations.

The expected accuracy of such a testing process is about 0.05%, with a typical goal that calibration accuracy is better than 0.3%. For some automotive camera lenses, the chromatic aberration can result in a 0.15% difference between red and green light. This dwarfs the expected accuracy of the measurement, which can result in false positives or negatives.

The present invention seeks to address these problems.

In accordance with the present invention this aim is achieved by new intrinsic parameter testing apparatus and methodology, which may variously shorten process time by using a plurality of collimators capable of azimuthal rotation, and address chromatic aberration by providing independently actuable illumination means, for selectively supplying light of various wavelength ranges.

SUMMARY OF THE INVENTION

In accordance with a first aspect of the present invention there is provided an intrinsic parameter testing tool for measuring intrinsic parameters or validating intrinsic parameter calibration of a camera under test, comprising:

a camera support for mounting a camera under test such that its optical axis extends outwardly therefrom in a predetermined direction, an infinity-focused collimator being positioned relative to the camera support so that the camera mounted on the camera support may obtain an image of a target surface from light passing through the collimator, wherein the collimator comprises first and second illumination means, for projecting images of a reticle associated with the collimator to the camera, while it is mounted on the camera support, and wherein the first illumination means is configured to produce light in a first wavelength range, and the second illumination means is configured to produce light in a second wavelength range, the first and second wavelength ranges being different.

In accordance with a second aspect of the present invention there is provided a method for testing a camera under test to measure its intrinsic parameters or to validate measured intrinsic parameters, comprising the steps of:

i) providing an intrinsic parameter testing tool, the intrinsic parameter testing tool comprising a camera support and an infinity-focused collimator, the collimator comprising first and second illumination means, for projecting respective images of a reticle associated with the collimator to the camera, while it is mounted on the camera support, the first illumination means being configured to produce light in a first wavelength range and the second illumination means being configured to produce light in a second wavelength range, the first and second wavelength ranges being different, ii) mounting the camera on the camera support so that its optical axis extends outwardly therefrom in a predetermined direction, iii) using the camera to obtain a first image of a target surface via the collimator while a first combination of the first and second illumination means is turned on, iv) using the camera to obtain a second image of a target surface via the collimator while a second combination of the first and second illumination means is turned on, the first and second combinations being different, and v) comparing the first and second images of the target surface with the actual target surface.

In accordance with a third aspect of the present invention there is provided an intrinsic parameter testing tool for measuring intrinsic parameters or validating intrinsic parameter calibration of a camera under test, comprising:

a camera support for mounting a camera under test such that its optical axis extends outwardly therefrom in a predetermined direction, a collimator support, a plurality of infinity-focused collimators mounted on the collimator support, each collimator of the plurality of collimators being positioned relative to the collimator support so that the camera mounted on the camera support may obtain an image of a target surface, the image comprising a plurality of sub-images corresponding to sub-regions of the target surface, each sub-image being obtained from light passing through a respective collimator of the plurality of collimators, wherein the collimator support is movably mounted so that it may be independently rotated about two rotary axes, the first, azimuthal, rotary axis being parallel to the optical axis of the camera when mounted on the camera support and the second rotary axis being substantially orthogonal to the first rotary axis.

In accordance with a fourth aspect of the present invention there is provided a method for testing a camera under test to measure its intrinsic parameters or to validate measured intrinsic parameters, comprising the steps of:

i) providing an intrinsic parameter testing tool, intrinsic parameter testing tool comprising a camera support, a collimator support and a plurality of infinity-focused collimators mounted on the collimator support, ii) mounting the camera on the camera support so that its optical axis extends outwardly therefrom in a predetermined direction, iii) using the camera to obtain an image of a target surface via each of the plurality of collimators while rotating the collimator support about a rotary axis orthogonal to the optical axis, iv) rotating the collimator support about an azimuthal rotary axis parallel to the optical axis, v) using the camera to obtain a further image of the target surface via each of the plurality of collimators while rotating the collimator support about a rotary axis orthogonal to the optical axis, and vi) comparing the images of the target surface with the actual target surface.

Other specific aspects and features of the present invention are set out in the accompanying claims.

BRIEF DESCRIPTION OF THE DRAWINGS

The invention will now be described with reference to the accompanying drawings (not to scale), in which.

DETAILED DESCRIPTION OF THE PREFERRED EMBODIMENTS OF THE INVENTION

Figure 5:
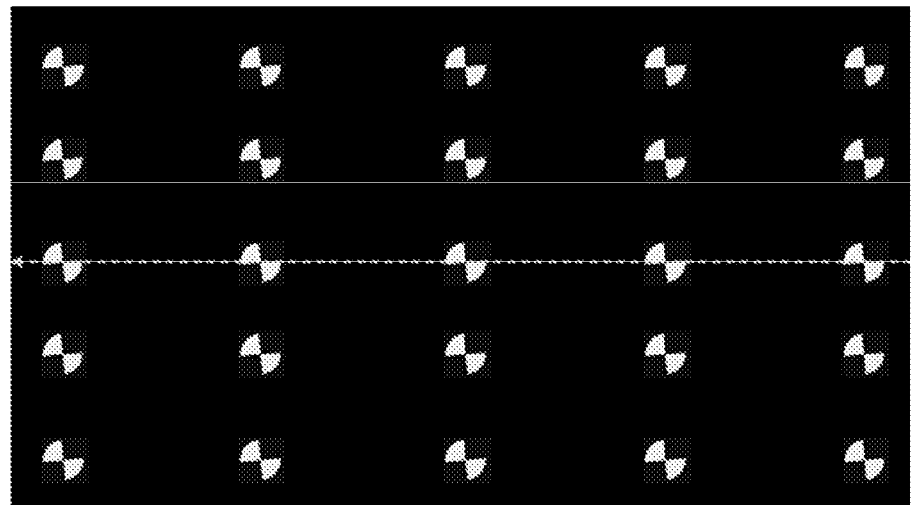
Figures 6, 7:
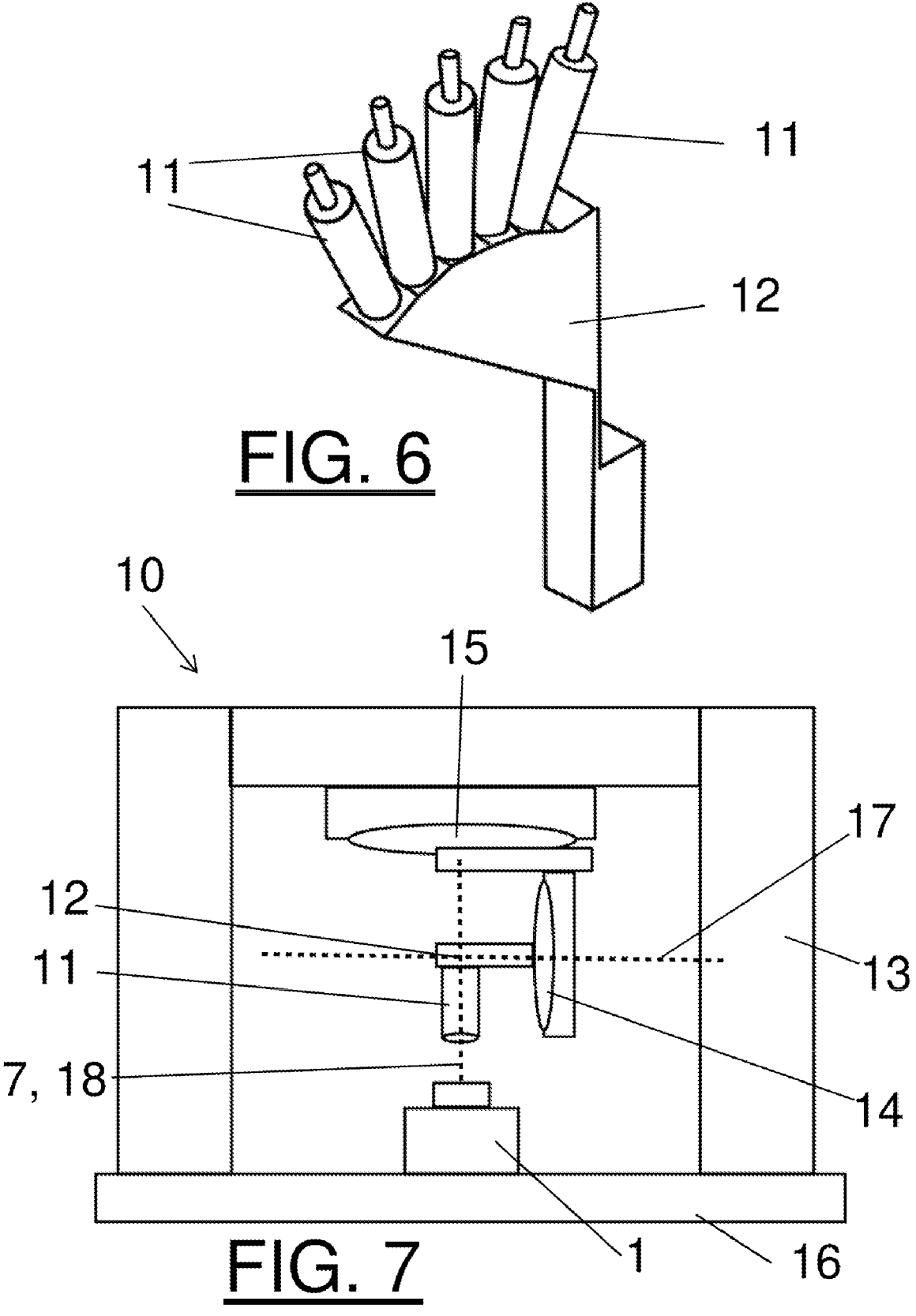
FIG. 6 schematically shows, in perspective view, a collimator support equipped with five collimators, for use with an intrinsic parameter testing tool of the present invention.
FIG. 7 schematically shows, in a side view, an intrinsic parameter testing tool according to an embodiment of the present invention.

A first embodiment of the present invention, which provides much faster scanning, is described with reference to FIGS. 5 to 7.

In this embodiment, an intrinsic parameter testing tool 10 is used which comprises a plurality of infinity-focused collimators 11. Each infinity-focused collimator 11 comprises a backlit reticle with a focusing lens to project that reticle as if it were infinitely far away. As shown in FIG. 6, here five collimators 11 are used, each mounted to a collimator support 12, so that rotation of the collimator support 12 causes rotation of all of the collimators 11 in concert. FIG. 7 schematically shows details of the intrinsic parameter testing tool 10, and how the collimator support 12 would be mounted within it. The camera 1 under test is mounted on a camera support 16 such that its optical axis 7 extends outwardly therefrom in a predetermined direction, here vertically upwards. A rigid frame 13 supports the collimator apparatus. The collimator support 12 is mounted to an elevation rotary actuator 14, which is actuable to rotate the collimator support 12 about an elevation rotary axis substantially orthogonal to the optical axis 7, i.e. horizontally as shown. The elevation rotary actuator 14 is in turn mounted to depend from an azimuthal rotary actuator 15, which is in turn supported by the frame 13. The azimuthal rotary actuator 15 is arranged to effect rotation of the elevation rotary actuator 14, and hence collimator support 12, about an azimuthal rotary axis substantially parallel to the optical axis 7. The collimator support 12 is movably mounted so that it may be independently rotated about these two rotary axes 17, 18.

Each collimator 11 of the plurality of collimators mounted on the collimator support 12, is positioned relative to the collimator support 12 so that the camera 1 mounted on the camera support 16 may obtain an image of a target surface, the image comprising a plurality of sub-images corresponding to sub-regions of the target surface, each sub-image being obtained from light passing through a respective collimator 11 of the plurality of collimators.

Once the camera 1 is mounted on the camera support 16 so that its optical axis 7 extends outwardly therefrom in a predetermined direction, the camera 1 is used to obtain an image of a target surface via each of the plurality of collimators 11 while rotating the collimator support 12 about the elevation rotary axis 17. The collimator support 12 may then be rotated about the azimuthal rotary axis 18, and the camera 1 used to obtain a further image of the target surface via each of the plurality of collimators 11 while so rotating the collimator support 12. The thus-obtained images of the target surface, illustrated in FIG. 5, may then be compared with the actual target surface, either to measure the intrinsic parameters, or to determine the accuracy of previously-measured intrinsic parameters.

The use of a plurality infinity-focused collimators 11 allows scans to be performed across more of the camera's field of view with the same number of images. Using these additional collimators 11 enables testing of the intrinsic parameters across the whole field of view in under twenty seconds.

This method significantly reduces the footprint, setup effort and time to test intrinsic parameter camera calibration while improving accuracy. The footprint of the intrinsic parameter testing tool 10 may be less than one square meter. Furthermore, there is very little dependence on the camera 1 under test; the tool 10 can accommodate cameras 1 with fields of view between 20 and 180 degrees without requiring a setup change. The use of infinity-focused collimators 11 gives a very accurate angular displacement, indeed this may be far more accurate than can be achieved using physical targets 2, 3 and a laser to measure the distances between them.

There are various advantages to rotating the collimators rather than the camera. For example, interfacing with the camera is simplified, since the cabling required to interconnect the camera 1 and a processing means (not shown) such as a computer used to analyze the obtained images does not need to be passed through any rotary supports. In addition, it is relatively simple to counterweight the elevation support mass to improve motion stability.

Figures 1, 2:
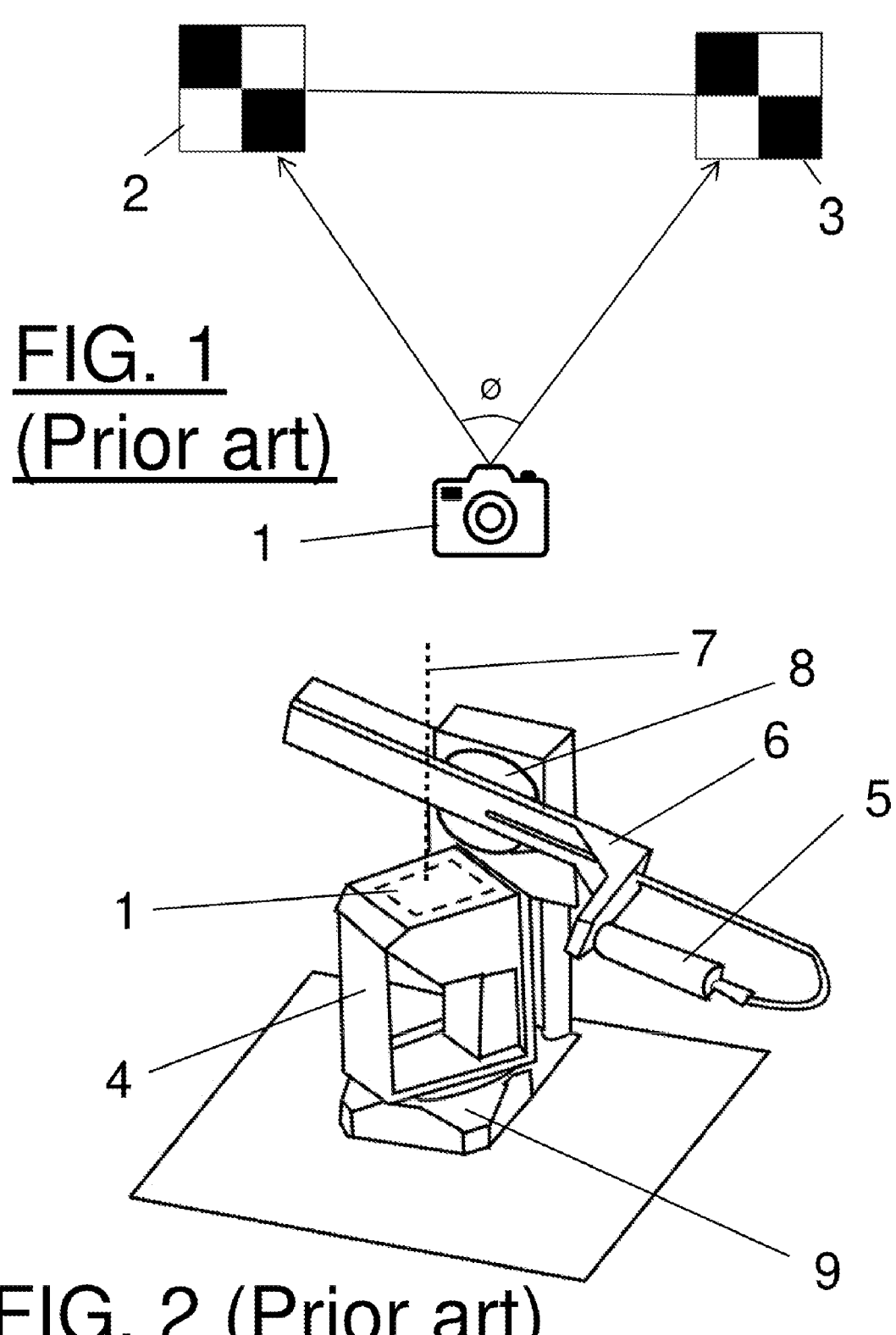
FIG. 1 schematically shows a known intrinsic parameter testing set-up.
FIG. 2 schematically shows, in perspective view from above, a known intrinsic parameter testing tool.
Figure 3:
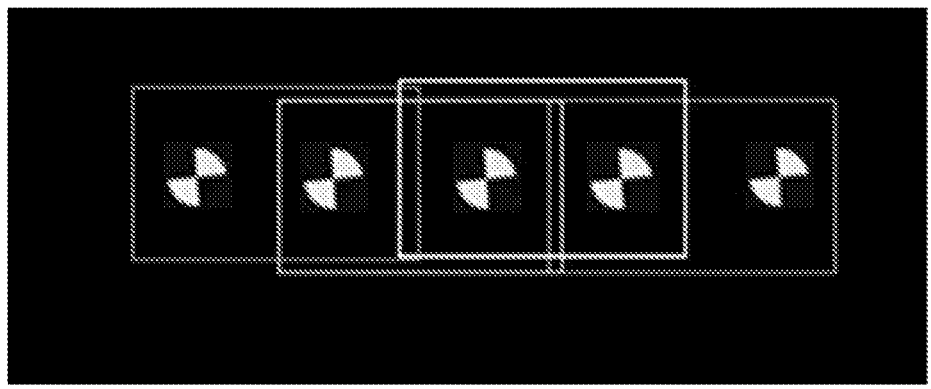
FIGS. 3-5 illustrate images obtained using various intrinsic parameter testing tools.
Figure 4:
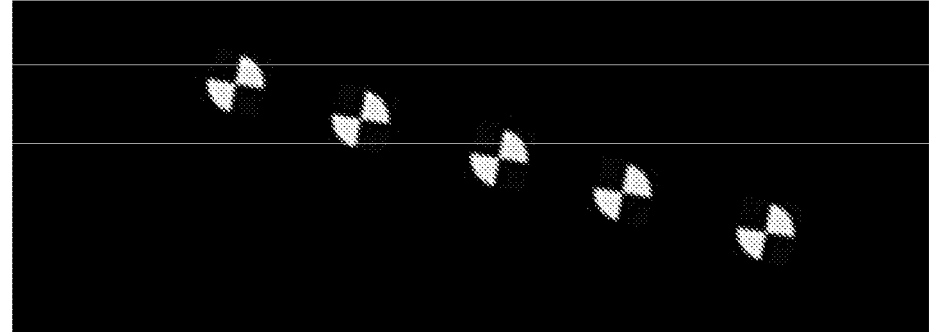
Figure 8:
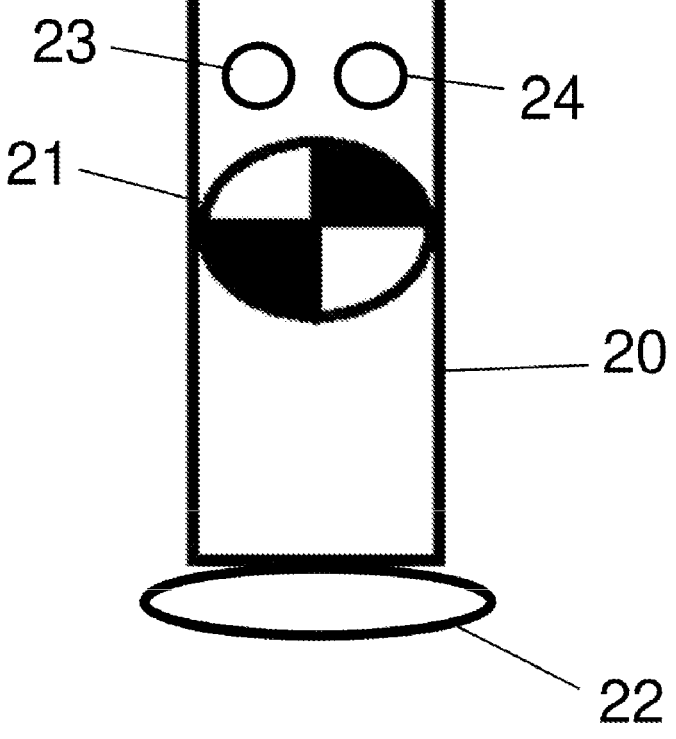
FIG. 8 schematically shows, in sectional side view, a collimator equipped with two different illumination means, for use with an intrinsic parameter testing tool of the present invention.

A second embodiment of the present invention, which provides testing of chromatic aberration, is described with reference to FIG. 8. This figure schematically shows an infinity-focused collimator 20 having a reticle 21 and a focusing lens 22, in a similar manner to the known collimator 5 described with reference to FIG. 2. The collimator 20 may be provided in an intrinsic parameter testing tool such as the tool 10 of FIG. 7, or the tool shown on FIG. 2 for example. In addition, the collimator 20 includes first and second illumination means, here a first LED 23 and a second LED 24, for projecting images of the reticle 21 to the camera 1 while it is mounted on a camera support of an intrinsic parameter testing tool. The first illumination means is configured to produce light in a first wavelength range, and the second illumination means is configured to produce light in a second wavelength range, the first and second wavelength ranges being different. Although not shown in FIG. 8, the collimator may optionally include additional illumination means, such as LEDs, which are configured to produce light in other, different, wavelength ranges. The illumination means are independently controllable, so that the wavelengths of light produced by the collimator 20 are controllable. This allows the collimator 20 to project the image of the reticle 21 to the camera 1 in a variety of colors. This permits the assessment of the impact of chromatic aberration on the accuracy of the intrinsic parameter testing.

For example, where the testing relates to validation of previously-measured intrinsic parameters, the intrinsic parameter validation test uses the location on the camera image of image captures of two collimator positions. The distance between these points (the distance may conveniently be measured in pixels) is converted into an angular distance which is compared to the actual angular distance that the collimator is moved between the two images. The chromatic aberration (or lateral color) can cause the distance between the collimator images to vary in an image space (i.e. pixels) depending on the color of the light. For instance, the two collimator images may have a 1000 pixel separation with green light (560 nm) but will be 1001 pixels with red light (650 nm) with the same angular distance between the physical collimator positions. This is a 0.1% difference that can be very impactful to error budgets that are often under 0.3%.

To understand the impact of the lateral color, the intrinsic parameter testing tool can test using different colors of light. In the previous example with red and green light instead of two images of one color, four images may be taken with two images in green and two images in red. This allows for quantification of the performance of the intrinsic parameters for both green and red and the 0.1% difference would be known. This can be extended to as many image pairs and colors as the user requires. The user could use a different set of intrinsic parameters for the different colors or (and this is more likely) ensure that they use a set of intrinsic parameters that gives acceptable performance across all wavelengths and color spectrums of importance.

Ideally, the collimator 20 can provide illumination at different colors, to simulate potential lighting conditions that could be seen by the camera 1 under test. This allows the tool to test the effect of chromatic aberration on the accuracy of the intrinsic parameters. Current intrinsic parameter testing schemes have little to no control over lighting and chromatic aberration can have significant impact on the overall accuracy of the measurement. The illumination means could for example include red, near infrared and several colors of white corresponding to real world lighting conditions such as high noon and sunrise.

In more detail, this apparatus may be used to ensure that the intrinsic parameter measurements for a camera 1 under test are accurate across the expected conditions that the camera would be used. For example, such cameras are often used in automotive applications where a broad set of light conditions should be tested. For such applications, the intrinsic parameters should be accurate for seeing red tail-lights and traffic lights (650 nm) or green traffic lights (560 nm). In some cases, cameras are also used in near-infrared (850-1000 nm) applications for driver monitoring. The cameras are also expected to accurately reflect the environment under different daylight conditions with a variety of color temperature spectrums. For example: dusk (about 3400K), high noon (about 5500K) or even a bright snowy day (8000K).

In some setups, it may be useful to produce certain lighting effects by turning on different combinations of illumination means. For example, if a first illumination means produces essentially white light, and the second illumination means produces colored light, then the first illumination means may be turned on continuously, while the second illumination means is turned on as required to assess the impact of changing colors throughout the day.

Various extensions or alternatives are possible. For example, if such collimators are used in a multi-collimator arrangement such as shown in FIGS. 6 and 7, then it may be possible to include the same, or different, color illumination means in each collimator of the plurality of collimators.

In all cases though, the basic methodology is similar: whichever type of intrinsic parameter testing tool is provided, the camera will be mounted on the camera support of the tool so that its optical axis extends outwardly therefrom in a predetermined direction. The camera is then used to obtain a first image of a target surface via the collimator while a first combination of the first and second illumination means is turned on. The camera is then used to obtain a second image of a target surface via the collimator while a second combination of the first and second illumination means is turned on, the first and second combinations being different. The first and second images of the target surface thus obtained may then be compared with the actual target surface either to measure intrinsic parameters or to determine the accuracy of previously-measured intrinsic parameters.

The above-described embodiments are exemplary only, and other possibilities and alternatives within the scope of the invention will be apparent to those skilled in the art.

REFERENCE NUMERALS USED

1—Camera
2, 3—Targets
4—Azimuthal rotary table
5—Infinity-focused collimator
6—Elevation rotary support
7—Optical axis
8—Elevation rotary actuator
9—Azimuthal rotary actuator
10—Intrinsic parameter testing tool
11—Collimators
12—Collimator support
13—Frame
14—Elevation rotary actuator
15—Azimuthal rotary actuator
16—Camera support
17—Elevation rotary axis
18—Azimuthal rotary axis
20—Collimator
21—Reticle
22—Focusing lens
23—First LED
24—Second LED

The invention claimed is:

1. An intrinsic parameter testing tool for measuring intrinsic parameters or validating intrinsic parameter calibration of a camera under test, comprising:

a camera support for mounting a camera under test such that its optical axis extends outwardly therefrom in a predetermined direction, an infinity-focused collimator being positioned relative to the camera support so that the camera mounted on the camera support may obtain an image of a target surface from light passing through the collimator, wherein the collimator comprises first and second illumination means, for projecting images of a reticle associated with the collimator to the camera, while it is mounted on the camera support, and wherein the first illumination means is configured to produce light in a first wavelength range, and the second illumination means is configured to produce light in a second wavelength range, the first and second wavelength ranges being different.

2. The intrinsic parameter testing tool of claim 1, wherein the collimator comprises the reticle.

3. The intrinsic parameter testing tool of claim 1, wherein the first and second illumination means are independently controllable.

4. The intrinsic parameter testing tool of claim 1, wherein the first and second illumination means comprise respective LEDs.

5. The intrinsic parameter testing tool of claim 1, comprising a collimator support, and wherein the infinity-based collimator is mounted on the collimator support, and wherein the collimator support is movably mounted so that it may be rotated about a rotary axis substantially orthogonal to the optical axis of the camera when mounted on the camera support.

6. The intrinsic parameter testing tool of claim 5, wherein the collimator support is movably mounted so that it may be independently rotated about an azimuthal rotary axis being substantially parallel to the optical axis of the camera when mounted on the camera support.

7. The intrinsic parameter testing tool of claim 5, comprising at least one additional infinity-focused collimator mounted on the collimator support, the at least one additional collimator being positioned relative to the camera support so that the camera mounted on the camera support may obtain an image of a target surface from light passing through the at least one additional collimator.

8. The intrinsic parameter testing tool of claim 7, wherein the at least one additional collimator comprises respective additional first and second illumination means, for projecting images of a respective reticle associated with the respective at least one additional collimator to the camera, while it is mounted on the camera support, and wherein each respective additional first illumination means is configured to produce light in a respective first wavelength range, and the respective additional second illumination means is configured to produce light in a respective second wavelength range, the respective first and second wavelength ranges being different.

9. A method for testing a camera under test to measure its intrinsic parameters or to validate measured intrinsic parameters, comprising the steps of:

i) providing an intrinsic parameter testing tool, the intrinsic parameter testing tool comprising a camera support and an infinity-focused collimator, the collimator comprising first and second illumination means, for projecting respective images of a reticle associated with the collimator to the camera, while it is mounted on the camera support, the first illumination means being configured to produce light in a first wavelength range and the second illumination means being configured to produce light in a second wavelength range, the first and second wavelength ranges being different, ii) mounting the camera on the camera support so that its optical axis extends outwardly therefrom in a predetermined direction, iii) using the camera to obtain a first image of a target surface via the collimator while a first combination of the first and second illumination means is turned on, iv) using the camera to obtain a second image of a target surface via the collimator while a second combination of the first and second illumination means is turned on, the first and second combinations being different, and v) comparing the first and second images of the target surface with the actual target surface.

10. The method of claim 9, wherein steps iii) and iv) comprise rotating the collimator about a rotary axis orthogonal to the optical axis while the first and second images are being obtained.

11. The method of claim 9, comprising the step, subsequent to step iv), of relatively rotating the camera and the collimator about an azimuthal rotary axis parallel to the optical axis, and repeating steps iii) and iv).

12. The method of claim 9, wherein the intrinsic parameter testing tool comprises a collimator support, the infinity-based collimator being mounted on the collimator support, and at least one additional infinity-focused collimator mounted on the collimator support, the at least one additional collimator being positioned relative to the camera support so that the camera mounted on the camera support may obtain an image of a target surface from light passing through the at least one additional collimator.

13. An intrinsic parameter testing tool for measuring intrinsic parameters or validating intrinsic parameter calibration of a camera under test, comprising:

a camera support for mounting a camera under test such that its optical axis extends outwardly therefrom in a predetermined direction, a collimator support, a plurality of infinity-focused collimators mounted on the collimator support, each collimator of the plurality of collimators being positioned relative to the collimator support so that the camera mounted on the camera support may obtain an image of a target surface, the image comprising a plurality of sub-images corresponding to sub-regions of the target surface, each sub-image being obtained from light passing through a respective collimator of the plurality of collimators, wherein the collimator support is movably mounted so that it may be independently rotated about two rotary axes, the first, azimuthal, rotary axis being parallel to the optical axis of the camera when mounted on the camera support and the second rotary axis being substantially orthogonal to the first rotary axis.

14. The intrinsic parameter testing tool of claim 13, comprising respective actuators arranged to rotate the collimator support about the first and second rotary axes.

15. The intrinsic parameter testing tool of claim 13, wherein at least one collimator of the plurality of collimators comprises first and second illumination means, for projecting respective images of a reticle associated with the collimator to the camera, while it is mounted on the camera support.

16. The intrinsic parameter testing tool of claim 15, wherein the first and second illumination means are independently controllable.

17. The intrinsic parameter testing tool of claim 15, wherein the first illumination means produces light in a first wavelength range, and the second illumination means produce light in a second wavelength range, the first and second wavelength ranges being different.

18. The intrinsic parameter testing tool of claim 15, wherein the first and second illumination means comprise respective LEDs.

19. A method for testing a camera under test to measure its intrinsic parameters or to validate measured intrinsic parameters, comprising the steps of:

i) providing an intrinsic parameter testing tool, intrinsic parameter testing tool comprising a camera support, a collimator support and a plurality of infinity-focused collimators mounted on the collimator support, ii) mounting the camera on the camera support so that its optical axis extends outwardly therefrom in a predetermined direction, iii) using the camera to obtain an image of a target surface via each of the plurality of collimators while rotating the collimator support about a rotary axis orthogonal to the optical axis, iv) rotating the collimator support about an azimuthal rotary axis parallel to the optical axis, v) using the camera to obtain a further image of the target surface via each of the plurality of collimators while rotating the collimator support about a rotary axis orthogonal to the optical axis, and vi) comparing the images of the target surface with the actual target surface.

20. The method of claim 19, wherein at least one collimator of the plurality of collimators comprises first and second illumination means, for projecting respective images of a reticle associated with the collimator to the camera, while it is mounted on the camera support, and wherein step iii) comprises using the camera to obtain a first image of a target surface via the collimator while a first combination of the first and second illumination means is turned on, and using the camera to obtain a second image of a target surface via the collimator while a second combination of the first and second illumination means is turned on, the first and second combinations being different.

* * * * *